United States Patent [19]

Robertson et al.

[11] Patent Number: 4,979,901

[45] Date of Patent: Dec. 25, 1990

[54] METHOD AND APPARATUS FOR PLANNING AND CONTROLLING DIET

[76] Inventors: Herbert R. Robertson; Joan E. Robertson, both of 6101 Pembridge Dr., Toledo, Ohio 43615

[21] Appl. No.: 456,329

[22] Filed: Dec. 26, 1989

[51] Int. Cl.⁵ .............................................. G09B 1/00
[52] U.S. Cl. .................................... 434/127; 434/430
[58] Field of Search ....................... 434/127, 238, 430

[56]  References Cited

U.S. PATENT DOCUMENTS

| | | | |
|---|---|---|---|
| 2,188,744 | 1/1940 | Turner | 40/67 |
| 2,337,594 | 12/1943 | Easley | 35/1 |
| 2,747,299 | 5/1956 | Herzog et al. | 35/74 |
| 3,491,715 | 1/1970 | Longarini | 434/127 X |
| 3,681,857 | 8/1972 | Yardley | 35/1 |
| 3,977,106 | 8/1976 | Kapp | 40/70 R |
| 4,278,255 | 7/1981 | Gilbert | 273/248 |
| 4,310,316 | 1/1982 | Thomann | 434/127 |
| 4,464,122 | 4/1984 | Fuller et al. | 434/127 X |
| 4,606,555 | 8/1986 | Adams | 434/127 X |
| 4,650,218 | 3/1987 | Hawke | 283/67 |
| 4,652,241 | 3/1987 | McCarty | 434/127 |
| 4,828,498 | 5/1989 | Tilney | 434/127 |

FOREIGN PATENT DOCUMENTS 2561419  9/1875  France ................................. 434/127

OTHER PUBLICATIONS

"Ashland Avenue"; Basic Fore, Inc.; Nov. 1989.
Research, Nov. 1989, vol. 89, No. 11, pp. 1612-1614, Sandra K. Shepherd et al.
Menu Minder Booklet, Blue Shift Software-pp. 1-27.
The Surgeon General's Report on Nutrition and Health, pp. 1-77.

Primary Examiner—Richard J. Apley
Assistant Examiner—Rachel M. Healey
Attorney, Agent, or Firm—John C. Purdue; David C. Purdue

[57]  ABSTRACT

A method and a device for planning means for an extended period of time is disclosed. The device comprises a planning board, a deck of meal menu cards and at least one daily totals strip. The device may further comprise a card display apparatus. The planning board contains a plurality of columns representing days and each column has a plurality of spaces representing meals in a day. At one end of the columns, there is a totals strip with information sections including indicia setting forth daily limits or goals for specific nutritional factors. The meal menu cards contain indicia setting forth a balanced meal and the cards include information sections with indicia setting forth nutritional factors for the meal. The information sections on the cards and the totals strip are each coded with a visually discernable characteristic such as color. Nutritional information from each card in a given column is totalled and compared with the daily goals or limits indicated on the totals strip. If necessary, cards are removed and replaced until the daily totals for the cards in each of the columns are within or close enough to the limits/goals on the totals strip. In a preferred embodiment, foods listed on the meal menu cards which are sources of vitamins or minerals are identified with a visually discernable characteristic, preferably color, and the board includes indicia setting forth requirements for sources of such vitamins and minerals for the number of days represented by columns on the board.

7 Claims, 6 Drawing Sheets

| | DAYS OF THE WEEK | | | | | | | GUIDES |
|---|---|---|---|---|---|---|---|---|
| | 1 | 2 | 3 | 4 | 5 | 6 | 7 | |
| BREAKFAST | ▦ | | | | | | | VITAMIN C ▦ ▦ ▦ ▦ ▦ ▦ ▦ |
| LUNCH | ▦ | | | | | | | |
| DINNER | | | | | | | | CALCIUM □ □ □ □ □ □ □ □ □ |
| SNACK and/or EXERCISE | | | | | | | | VITAMIN A ▦ ▦ ▦ ▦ |
| TOTAL | ▦ | ▦ | ▦ | ▦ | ▦ | ▦ | ▦ | |

FIG. 1

METHOD AND APPARATUS FOR PLANNING AND CONTROLLING DIET

BACKGROUND OF THE INVENTION

1. Field of the Invention

The invention relates to apparatus and a method for using the apparatus for planning human dietary intake and for controlling such intake to achieve dietary goals.

2. Description of the Prior Art

In 1988, then Surgeon General C. Everett Koop M.D. issued the first *Surgeon General's Report on Nutrition and Health* and it highlights the urgent need in America and the world for regulating dietary excesses and imbalances for better health. According to the report, dietary factors play a prominent role in five of the ten leading causes of death for Americans. This Report has been compared to the 1964 Surgeon General's report on smoking, but one fundamental difference has been observed: food is necessary for good health and cannot be avoided. Rather, it is necessary to control and regulate dietary intake, taking into account personal preferences as well as the substantial body of scientific knowledge about diet and its effects on health, to achieve better health. The Report goes on to spell out specific recommendations but does not provide a mechanism for incorporating these changes in the daily or weekly menu planning process.

In the field of diet, innumerable books have been written, computer programs have been written and, with alarming regularity, new fads have come and gone. One computer program called "MENU MINDER" can be used to plan and track daily and weekly menus. Deal a Meal, which appears to be more than a fad, is an exchange based means for controlling dietary intake.

Several patents disclose various means for planning and regulating dietary intake U.S. Pat. No. 2,188,744 discloses a device for selecting and displaying the courses for a specific meal. U.S. Pat. No. 2,337,594 discloses decks of menu cards. Each card contains indicia representing an element of a meal and each card has an opening which is registrable with one or more of the indicia provided on other cards so that a stack of cards can be assembled with indicia from each of the cards being visible from the top of the stack.

U.S. Pat. No. 2,747,299 entitled "Nutritive Evaluating Food Item Selector" discloses a wheel device with a data disc and a masking disc secured together so that they can be rotated relative to one another. Openings in the masking disc are registrable with indicia provided on the data disc so that nutritional information for a particular food item can be easily determined.

U.S. Pat. No. 3,681,857 discloses a device for monitoring the properties of selected foods. The device comprises a board, a plurality of strips with indicia representing a food and nutritional information therefor and means for attaching the strips to the board.

U.S. Pat. No. 3,977,106 discloses a wheel device with multiple food, calorie, cholesterol and nutritional information indicia on a data disc. A masking disc can be rotated so that indicia for a particular food register with openings in the mask disc.

U.S. Pat. No. 4,310,316 discloses diet control apparatus which is exchange based. The apparatus comprises food tokens for several categories of foods, containers corresponding with meals for housing food tokens for such meals, a food chart with serving size information for a number of foods in each category, a container for receiving "spent" food tokens and, optionally, a container for the other elements of the apparatus.

U.S. Pat. No. 4,650,218 discloses a method and apparatus for controlling caloric intake. The method and apparatus are exchange based, and the apparatus comprises cards provided with exchange tabs and these can be tailored to a particular dietary goal.

SUMMARY OF THE INVENTION

The present invention is directed to a method and a device for planning menus for an extended period of time with attention to specific dietary goals The device comprises a planning board, a deck of meal menu cards and at least one daily totals strip. The device may further comprise a display device for displaying selected meal menu cards. The planning board contains a plurality of columns representing days of the week and each column is broken down into a plurality of spaces representing meals in a day. At one end of the columns, there is a totals strip or a space for receiving a totals strip. The totals strip is provided with information sections with indicia setting forth daily limits or goals for specific nutritional factors. The meal menu cards contain indicia setting forth a balanced meal and the cards include information sections with indicia setting forth nutritional factors for the meal. The information sections on the card are each coded with a visually discernable characteristic such as color and there is a corresponding characteristic associated with the corresponding information sections provided on the totals strip. Nutritional information from each card in a given column is totalled and compared with the daily goals or limits indicated on the totals strip. If necessary, cards are removed and replaced until the daily totals for the cards in each of the columns are within or close enough to the limits/goals on the totals strip. In a preferred embodiment, foods listed on the meal menu cards which are sources of vitamins or minerals are identified with a visually discernable characteristic which is different for each vitamin and mineral. The characteristics are preferably color and the board includes indicia, preferably color coded, setting forth requirements for such vitamins and minerals for the number of days represented by columns on the board.

BRIEF DESCRIPTION OF THE DRAWINGS

FIG. 1 is a plan view of apparatus for planning menus comprising a board, a plurality of meal menu cards and a totals strip.

DETAILED DESCRIPTION OF THE PREFERRED EMBODIMENTS

Figure 2:
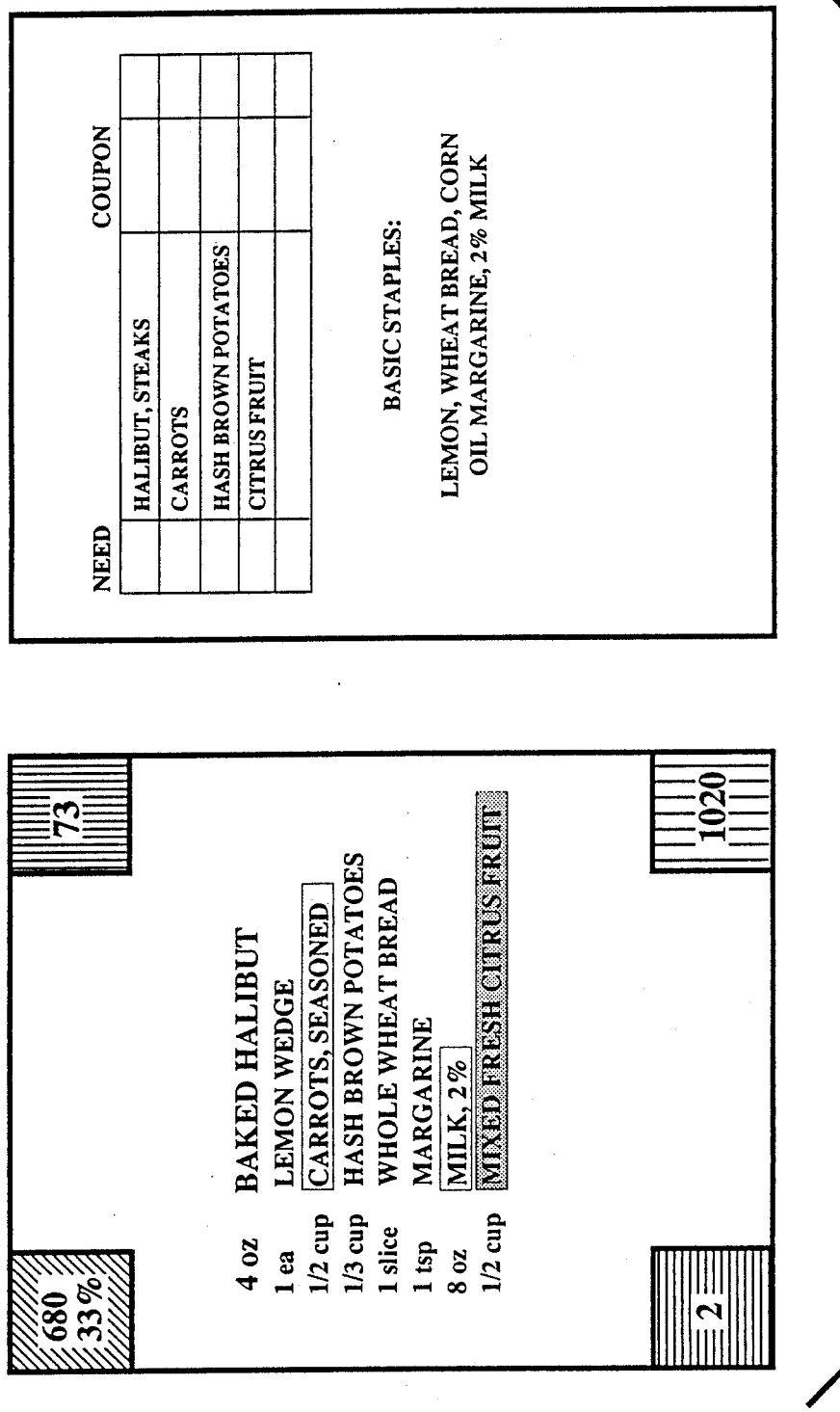
FIG. 2 is a plan view showing the front and back of a meal menu card.

With reference to FIG. 1, a device for planning menus is indicated generally at 10. The device comprises a planning board 12, at least one deck of cards, two of which cards are indicated at 14, and indicia provided on each. The board 12 illustrated in FIG. 1 includes seven columns 16, corresponding with the seven days in a week. A plurality of spaces 18 are provided in each column 16. At the end of the columns 16, there is a totals strip 20 with a number of spaces 22 corresponding with the number of columns 16 on the board 12.

The spaces 22 on the totals strip 20 include indicia comprising first, second, third and fourth identification sections 24t, 26t, 28t and 30t, respectively. Similarly, each of the cards 14 include indicia comprising first, second, third and fourth information sections 24c, 26c, 28c and 30c, respectively. As shown in more detail in subsequent FIGS., each pair of information/identification sections, i.e., 24c and 24t, 26c and 26t, 28c and 28t, and 30c and 30t bear a visually discernable characteristic such as color.

Headings are provided on the board 12 for convenience. Numbers representing the days of the week are provided above the columns 16. Legends corresponding with "Breakfast", "Lunch", "Dinner" and "Snack and/or Exercise" appear in the margin, to the left of the columns 16. In the right margin, near the top of the board 12, the legend "Guides" appears. Below it, in the right margin, is indicia which represents recommended intake, in terms of the number of significant sources thereof, of Vitamin A, Vitamin C and Calcium, for the number of days/columns 16 appearing on the board 12. Seven color blocks 32, corresponding with seven significant sources of Vitamin C per week, are provided below the heading Vitamin C in the right margin of the board 12. Similarly, seven color blocks 34, corresponding with seven significant sources of Calcium per week, are provided below the heading Calcium and four color blocks 36, corresponding with four significant sources of Vitamin A per week are provided below the heading Vitamin A.

With reference to FIG. 2, the front 38 of a card 14, adapted for home use, includes indicia comprising first, second, third and fourth information sections 24c, 26c, 28c and 30c, respectively. The sections 24c, 26c, 28c and 30c are each shaded differently to represent different colorations or other visually discernable characteristics and this shading corresponds with the shading provided on corresponding sections 24t, 26t, 28t and 30t in a totals strip 20 shown in FIGS. 3 and 4.

On the front 38 of the card 14, there is provided indicia indicated at 42 representing a balanced meal menu consisting of halibut, a lemon wedge, carrots, hash brown potatoes, bread, margarine, milk and mixed citrus fruit. The information section 24c on the front 38 of the card 14 contains two numbers; 680 represents the calories in the meal and 33% represents the percentage of those calories which come from fat. Similarly, informational section 26c contains the number 73 which represents the cholesterol content, in milligrams of the foods in the meal. Informational section 28c contains the number 1020 which represents the sodium content, in milligrams, of the foods in the meal. Informational section 30c contains the number 2 which represents the fiber content, in grams, of the foods in the meal.

Figure 3:
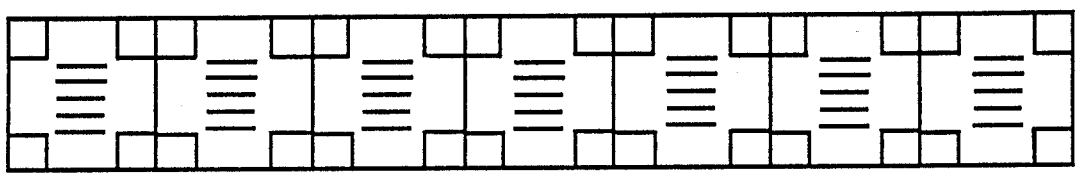
FIG. 3 is a plan view of a totals strip.
Figure 4:
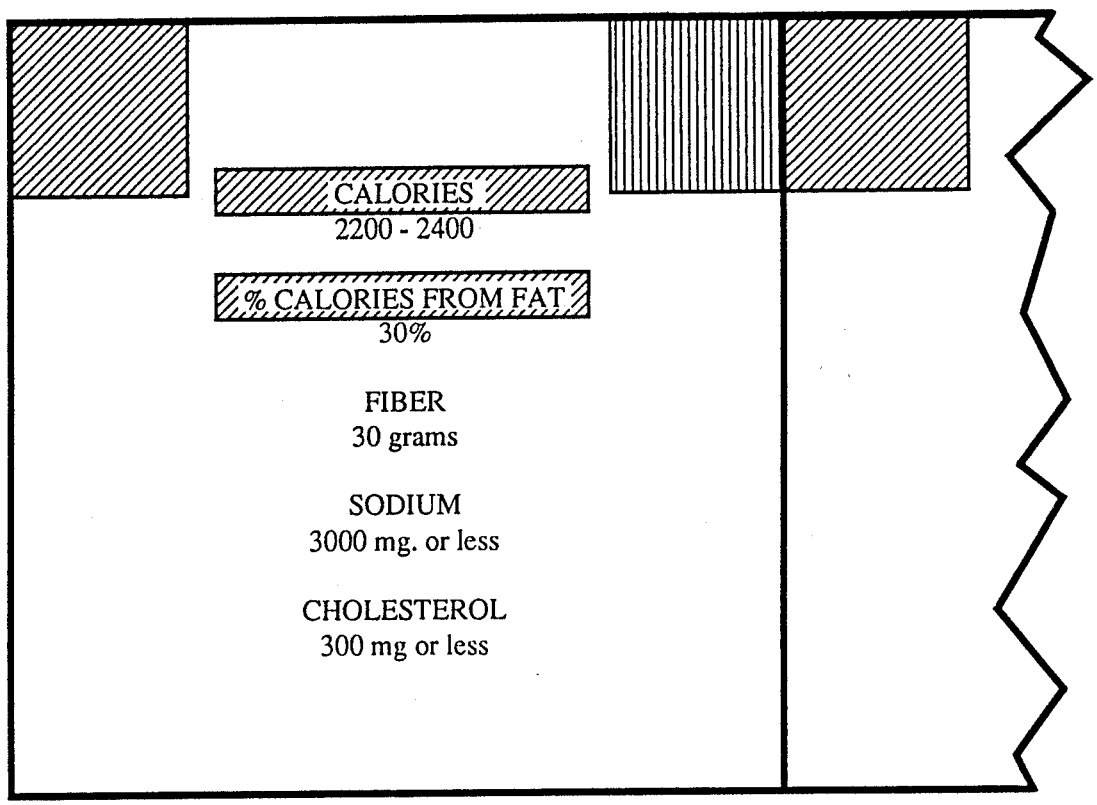
FIG. 4 is a broken away plan view showing detail for a portion of the totals strip illustrated in FIG. 3.

Referring now to FIG. 3, the totals strip 20 contains seven spaces 22 corresponding with the number of days/columns 16 on the board 12. Each space contains four identification sections 24t, 26t, 28t and 30t corresponding in shading and location with the information sections 24c, 26c, 28c and 30c on the front 38 of the cards 14. In the center of each space 22 on the totals strip 20, there are information sections 44, 46, 48 and 50 corresponding with the identification sections 24t, 30t, 28t and 26t. Information section 44 contains the legend Calories, contains shading corresponding with the shading of information section 24c and the shading of identification section 24t, and contains the number range 2200-2400 representing a daily caloric intake goal which would be part of a weight maintenance diet for a majority of people. The information section 44 also contains the legend % Calories From Fat, contains shading corresponding with the shading of information section 24c and the shading of identification section 24t and contains the number 30% representing a daily percentage of calories from fat goal which would be part of a weight maintenance diet for a majority of people. Information section 46 contains the legend Fiber, contains shading corresponding with the shading of information section 30c and the shading of identification section 30t, and contains the number 30 representing a daily fiber intake goal, in grams, which would be part of a weight maintenance diet for a majority of people. Information section 48 contains the legend Sodium, contains shading corresponding with the shading of information section 28c and the shading of identification section 28t, and contains the number 3000 representing a daily limit on sodium intake which would be tolerable for a majority of people who are not on restricted sodium diets. Information section 50 contains the legend Cholesterol, contains shading corresponding with the shading of information section 26c and the shading of identification section 26t, and contains the legend 300 mg. or less, representing a daily limit on cholesterol intake which would be tolerable for a majority of people who are not on restricted cholesterol diets.

It is preferred that a "basic" totals strip be printed or otherwise provided directly on the board 12, as shown in FIG. 1. Such a strip would have a wide application in that it would be suitable for many individuals who are not on a restricted diet. Additional totals strips, for restricted diets, can be provided and can be overlaid on the totals strip 20. Alternatively, a blank space could be provided on the board 12 so that one could select a totals strip and position it at the ends of the columns 16.

The totals strip 20 contains seven spaces 22 corresponding with the seven columns 16 on the board 12 so that, if desired, different daily nutritional goals/limits can be provided in different ones of the spaces 22. It will be appreciated that, if variations in daily nutritional goals/limits are not needed, the seven spaces 22 on the totals strip 20 could be replaced with a single space (not shown) containing information corresponding with the information provided in each of the seven spaces 22.

According to a method for using the device 10, one would select a totals strip which encompassed his or her nutritional and dietary needs and position that strip at the end of the columns 16. With the board laid flat, one would then select cards from a deck of such cards and position them in the spaces 18 on the board 12. With the cards so positioned, one then totals the calorie numbers in the information sections 24c from each of the cards in a given column 16. The total is then compared with range in the information section 44 of the totals strip and, if necessary, cards are switched in the given column until the total is within, or close enough to, the range set forth in information section 44. This procedure is then repeated for the cholesterol numbers in information sections 26c relative to the cholesterol limits in information section 50, the sodium numbers in information section 28c relative to the sodium limit in information section 48, and the fiber numbers in the information section 30c relative to the fiber number in the information section 46. This procedure is repeated for all of the columns 16 on the board 12. It is to be understood that deviations from the daily totals can be tolerated by most individuals so that the process described above is not as tedious as it may sound, at first blush. Moreover, there is a very sharp rise in the learning curve for using the device 10 so that the time required to carry out the foregoing procedure will decrease dramatically over the first few weeks of use.

Some of the food items listed on the front 38 of the card 14 are contained in boxes 52 (carrots), 54 (milk) and 56 (mixed citrus fruit). The boxes 52, 54 and 56 are shaded and the shading of box 52 (carrots) corresponds with the shading of the color blocks 36 (vitamin A) provided on the board 12 (FIG. 1). Similarly, the shading of box 54 (milk) corresponds with the shading of the color blocks 34 (calcium) and the shading of box 56 (mixed citrus fruit) corresponds with the shading of color blocks 32 (vitamin C). When a plurality of selected cards are positioned on the board 12, front side 38 up, one can readily count the number of boxes on the selected cards which are shaded, for example, like box 52 (carrots), and compare the total number of such boxes to the number of color boxes 36 (vitamin A) to determine whether or not the selected cards provide the recommended number of significant sources of vitamin A for the number of days represented by columns 16 on the board 12. If not, cards can be switched until the recommended number of significant sources are provided for in the menu plan. It may be necessary, if substantial switching is done, to recheck daily totals and make further card switches.

It will be appreciated that the color blocks 32 on the board 12 could be replaced with a number representing the recommended daily intake of vitamin C, for example. It is preferred, however, to provide a visually discernable characteristic, such as color, associated with the boxes 52, 54 and 56 and a corresponding, visually discernable characteristic associated with the information concerning recommended vitamin and mineral intake provided in the right margin of the board 12. It will also be appreciated that the color blocks 32, 34 and 36 might be provided on a strip or different color block information might be provided on a plurality of strips which could be positioned on the board 12. It is preferred, however, that a basic set of color blocks be provided directly on the board 12.

The cards 14 are provided with backs 58 (FIG. 2) which contain a list of the staple and non-staple items which are required for preparing the meal menu set forth on the front 38 of the card 14. This information is especially useful in preparing a shopping list for a week's worth of menus. There is a column 60 of spaces in which one can make a mark to indicate that an item needs to be purchased. There is a second column 62 of spaces in which one can make a mark to indicate that one has a coupon for a particular item. In this regard, it is preferred that the back 58 of the cards be coated with a plastic material which enables the use of water soluble markers so that marks can be made on and removed from the back 58. Once suitable cards have been selected for all of the columns 16 on the board 12, the cards 14 can be removed from the board and shopping information can be transferred from the back 58 of a card or, by those who know the ingredients for a particular meal, from the front 38 of the card 14, to a shopping list.

Figure 5:
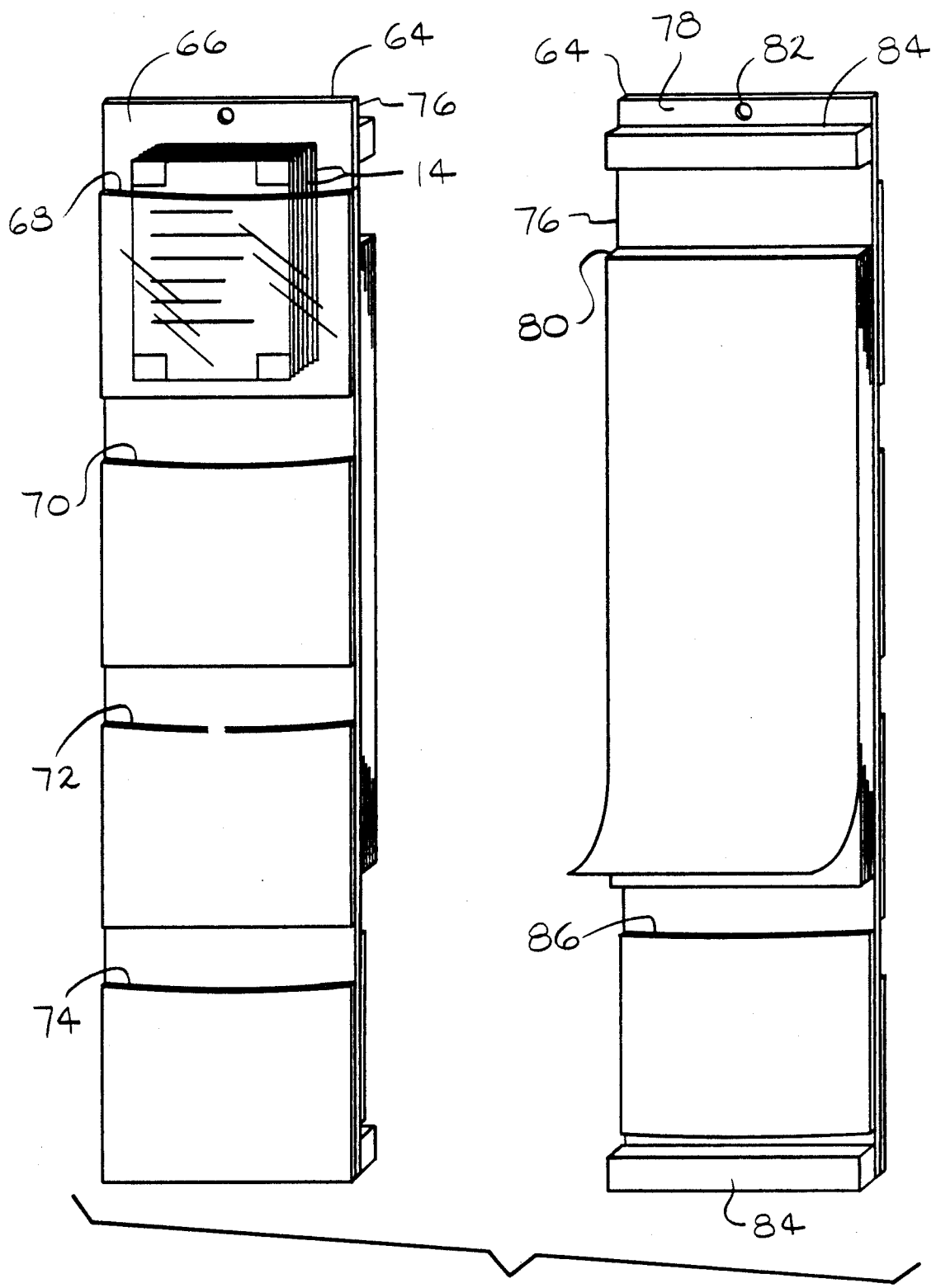
FIG. 5 is a perspective view showing the front and back of a display device for meal menu cards.

Once shopping list information has been recorded, it is preferred to display the selected cards in a display device indicated generally at 64 in FIG. 5. The device 64 has a front side 66 provided with four pockets defined by four pocket covers 68, 70, 72 and 74 secured at their bottoms and sides to a base 76. Seven breakfast menu cards 14 are positioned, in order, i.e., day 1 in front, day 2 behind it, etc., between the pocket cover 68 and the base 76. The pocket covers 68, 70, 72 and 74 are preferably made from a clear plastic material so that the meal menu information on the first card in each pocket can be seen through the pocket cover therefor. Thus, the display device 64 provides a way of storing all of the meal menu cards 14 which have been selected for a particular group of days, and provides a means for displaying meal menu cards for a specific day.

On the back 78 of the display device 64, there is a provided a pad 80 of paper which can be used for recording shopping information from a selected group of meal menu cards 14. Eye means 82 are provided for hanging the display device 64 on hook means (not shown). Alternatively, magnet means 84 are provided for supporting the device 64 on a metal surface (not shown) such as a refrigerator. A pocket for holding coupons is defined on the back 78 of the display device 64 between a pocket front 86 and the base 76. Coupons can be collected in the coupon pocket and the collected coupons can be used as a basis for planning the menu for the next week. Coupons, particularly coupons for a main course item, are readily incorporated in a method for using the device 10. A coupon (not shown) for a particular item is selected and a card with that item in the meal menu printed thereon is selected and positioned on the planning board.

Figure 6:
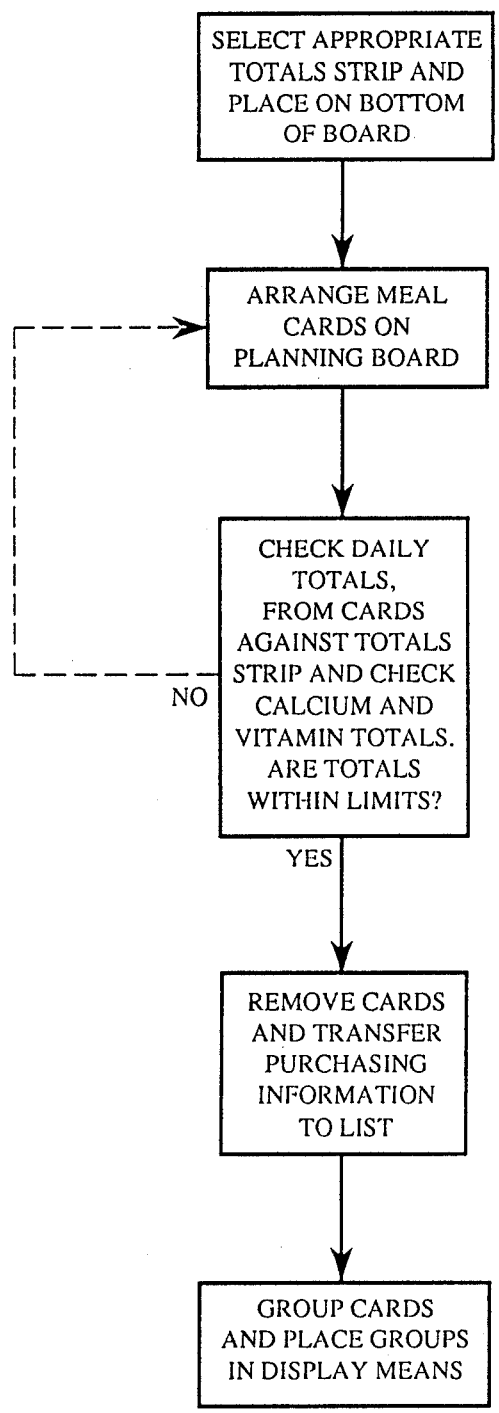
FIG. 6 is a flow chart illustrating the steps of a method for using the menu planning apparatus of the present invention.

Thus, a method for using the display device 64 with the board 12, a deck of the cards 14 and a set of totals strips has been described, corresponding with the steps set forth in a flow chart illustrated in FIG. 6. The method comprises the following steps:

1. Selecting a totals strip reflecting the dietary needs/goals of an individual or a group of individuals and placing the totals strip on a board at the end of a plurality of columns representing days, each column containing a plurality of spaces representing meals for that day.
2. Selecting desired meal cards from a plurality of cards containing meal menus and nutritional information for those meals, and arranging them, as desired, in the spaces in the columns.
3. Adding nutritional information from the cards in each column and checking daily totals against information on the totals strip; if totals from cards are within limits provided on totals strip, proceeding to step 4 and, if totals from cards are not within limits provided on totals strip, repeating step 3.

4. Removing cards from board and transferring purchasing information from meal cards to a shopping list.
5. Placing cards in display device.

Figure 7:
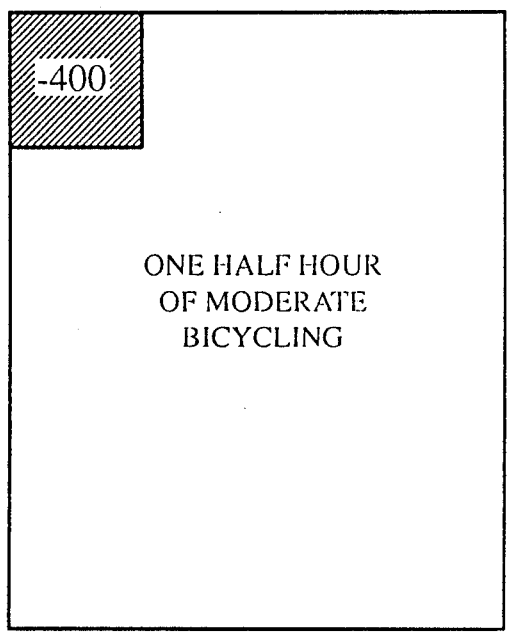
FIG. 7 is a plan view of the front of an exercise card.

Referring now to FIG. 7, an example of an exercise card is indicated generally at 86. An information section 88 contains the number −400 and this refers to the calories burned during one half hour of moderate cycling, as indicated in the center of the card 86. The information section 88 contains shading corresponding with the shading of information section 24c and the shading of identification section 24t. The use of exercise cards such as the card 86 provides a novel dimension to the menu planning device 10 and provides some flexibility in making daily totals from a group of selected cards fall within the limits set forth on a given totals strip.

Figure 8:
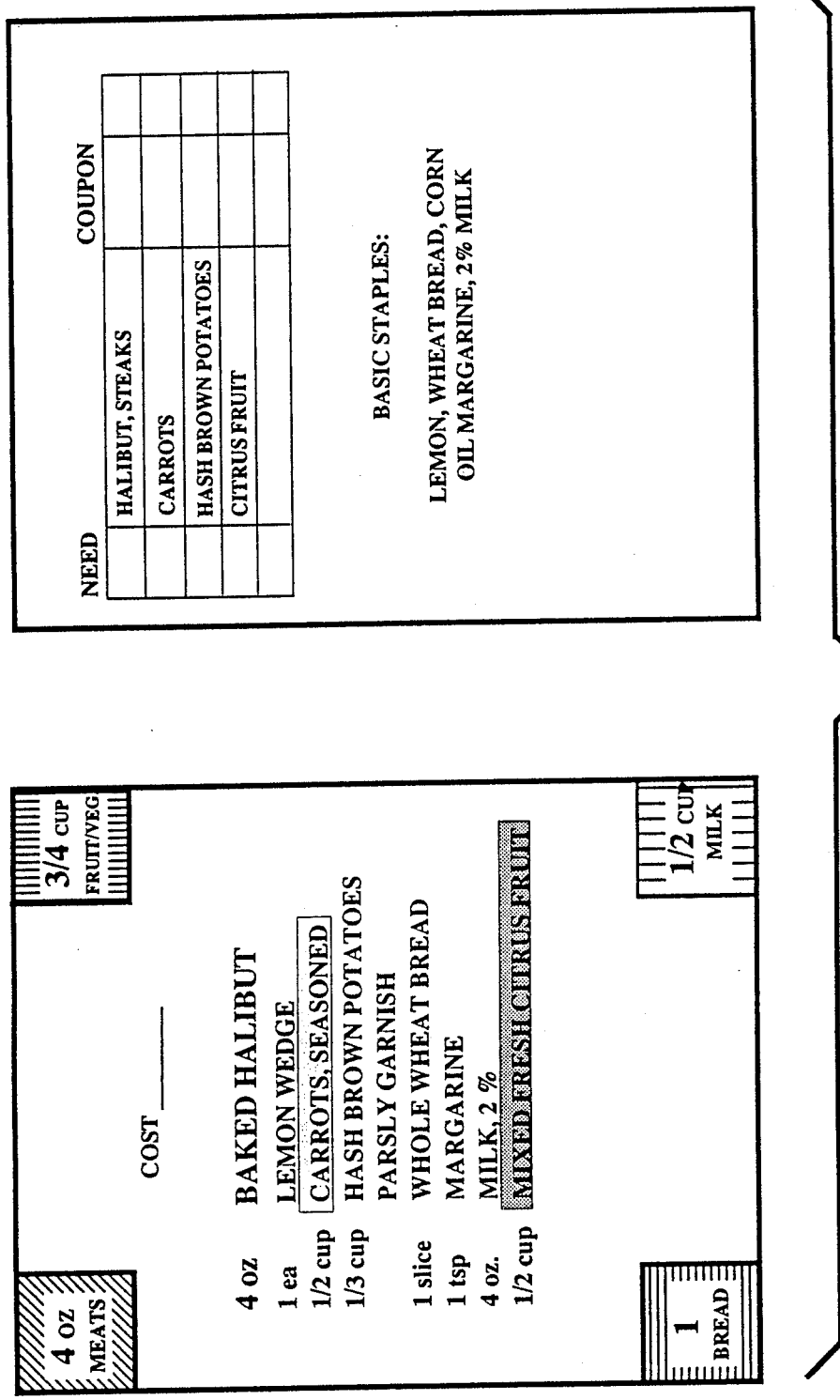
FIG. 8 is a plan view showing the front and back of a second embodiment of a meal menu card for use with a menu planning device according to the present invention.

In FIG. 8, a card 90 for institutional use is illustrated with a front 92 provided with indicia comprising four information sections 94c, 96c, 98c and 100c. Cards corresponding with the card 90 are adapted for use with a totals strip 102 shown in FIGS. 9 and 10. The card 90 and the totals strip 102 correspond with the card 14 and the totals strip 20 except that the former are exchange based and, therefor, more suited for institutional use. The information sections 94c, 96c, 98c and 100c are each shaded differently to represent different colorations or other visually discernable characteristics and this shading corresponds with the shading provided on corresponding identification sections 104t, 106t, 108t and 110t provided on the totals strip 102 shown in FIGS. 9 and 10.

On the front 92 of the card 90, there is provided indicia indicated at 112 representing a balanced meal menu consisting of halibut, a lemon wedge, carrots, hash brown potatoes, bread, margarine, milk and mixed citrus fruit. The information section 94c on the front 92 of the card 90 contains the legend "2 meats" which represents the number of meat exchanges in the meal. Similarly, informational section 96c contains the legend "½ Cup Fruit/Veg" which represents the cup based exchanges of fruits and vegetables in the meal. Informational section 98c contains the legend "½ Cup of Milk" which represents the cup based exchanges of milk provided in the meal. Informational section 100c contains the legend "1 Bread" which represents the bread exchanges in the meal.

Figure 9:
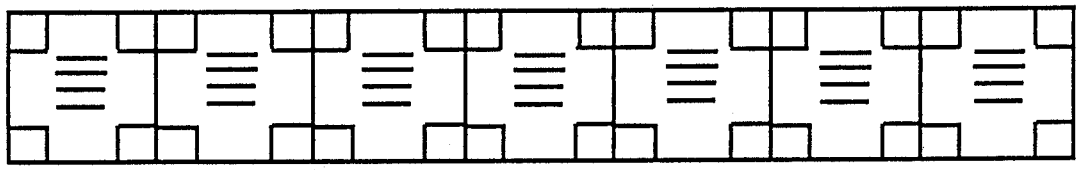
FIG. 9 is a plan view showing a totals strip for use with the type of meal menu card shown in FIG. 8.
Figure 10:
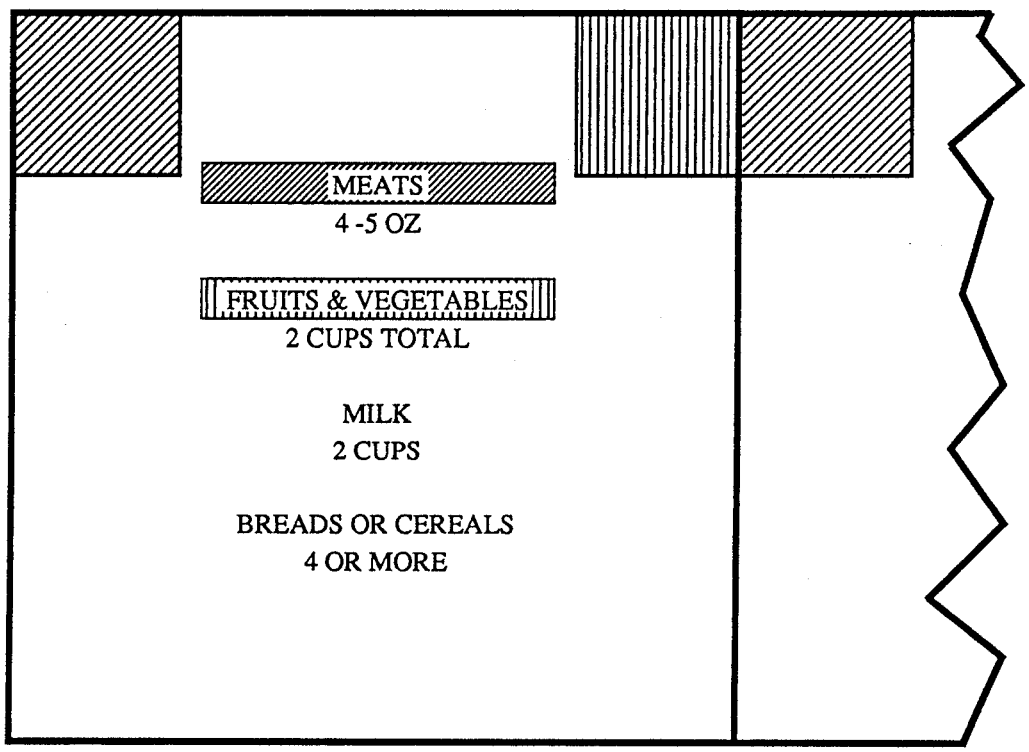
FIG. 10 is a broken away plan view showing detail for a portion of the totals strip illustrated in FIG. 9.
Figure 2:
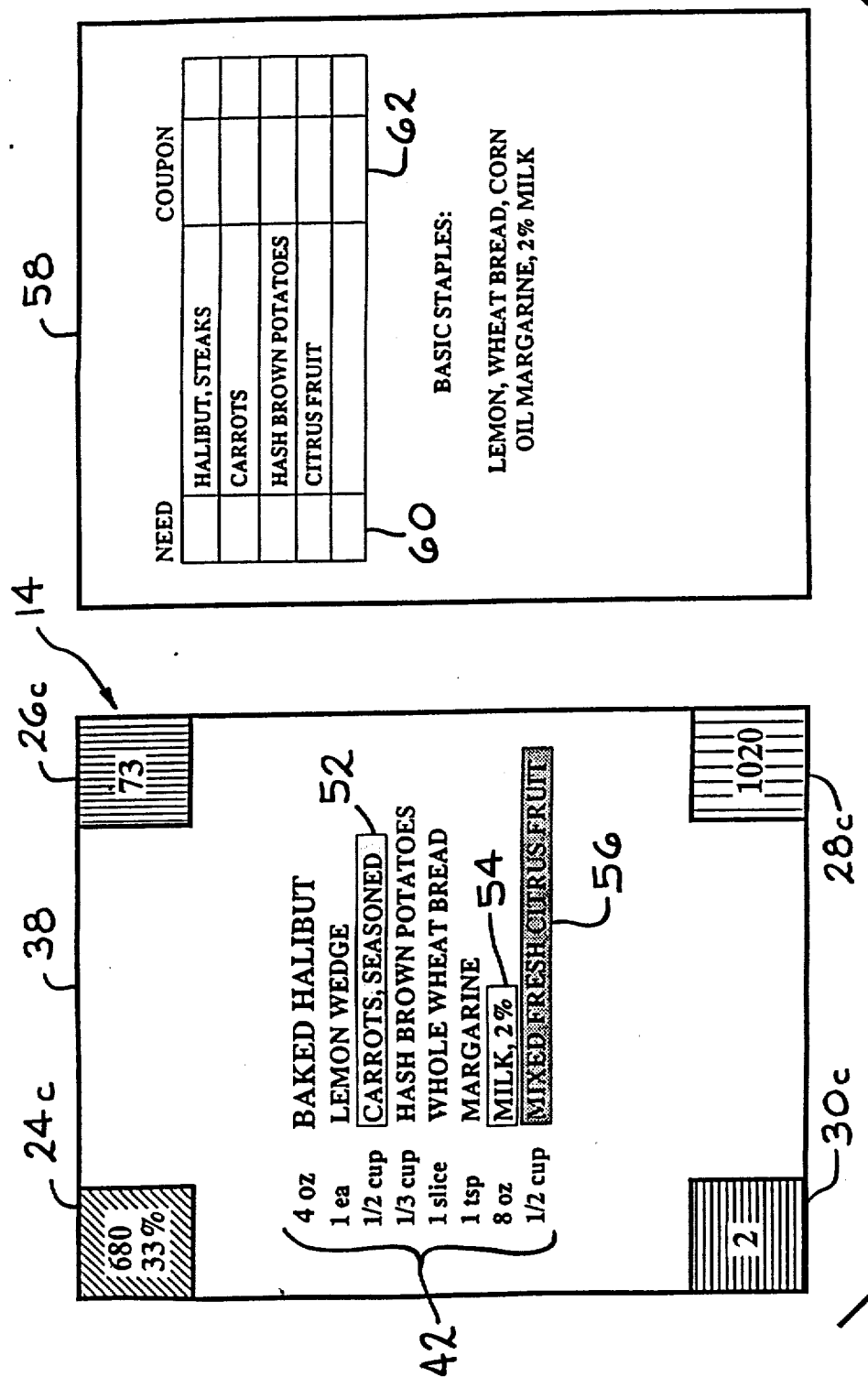
Figure 3:
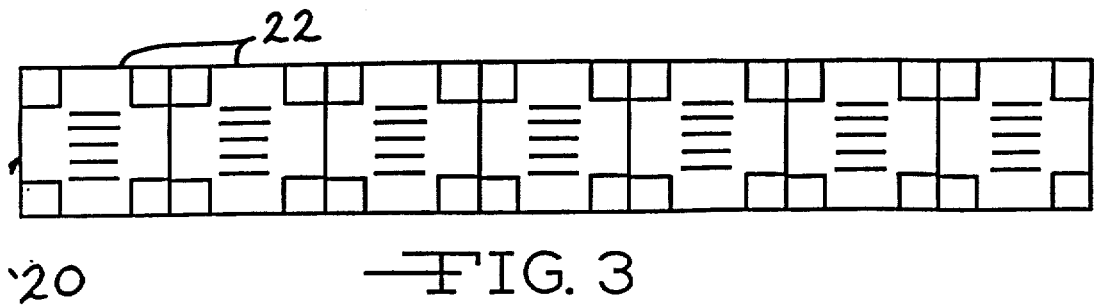
Figure 4:
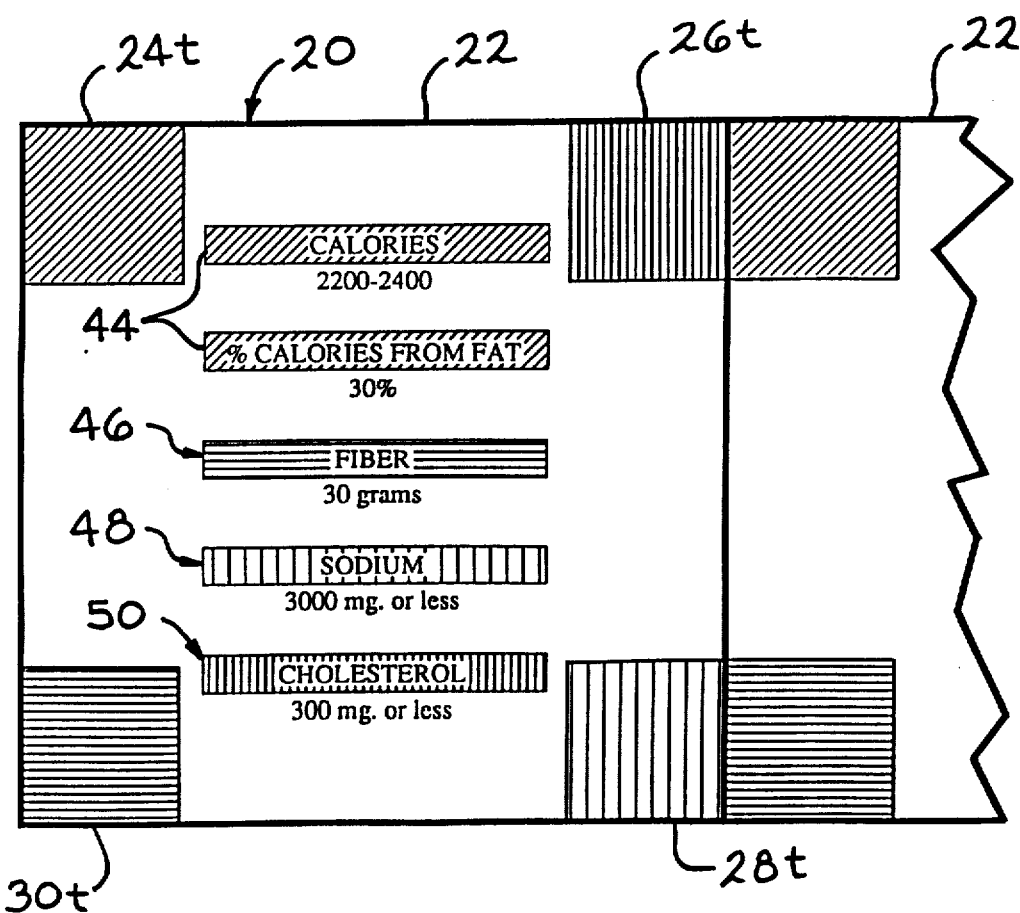
Figure 5:
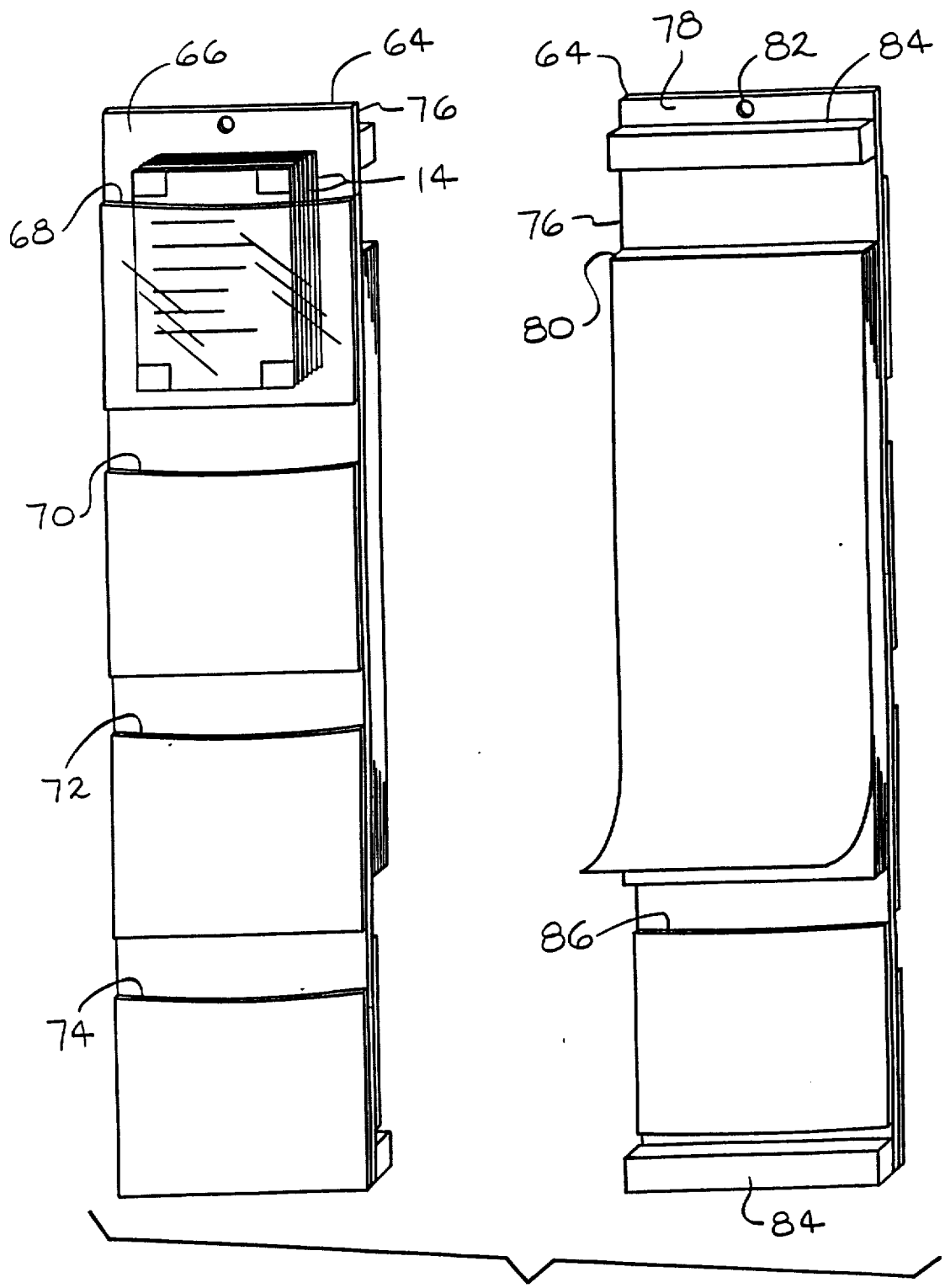
Figure 6:
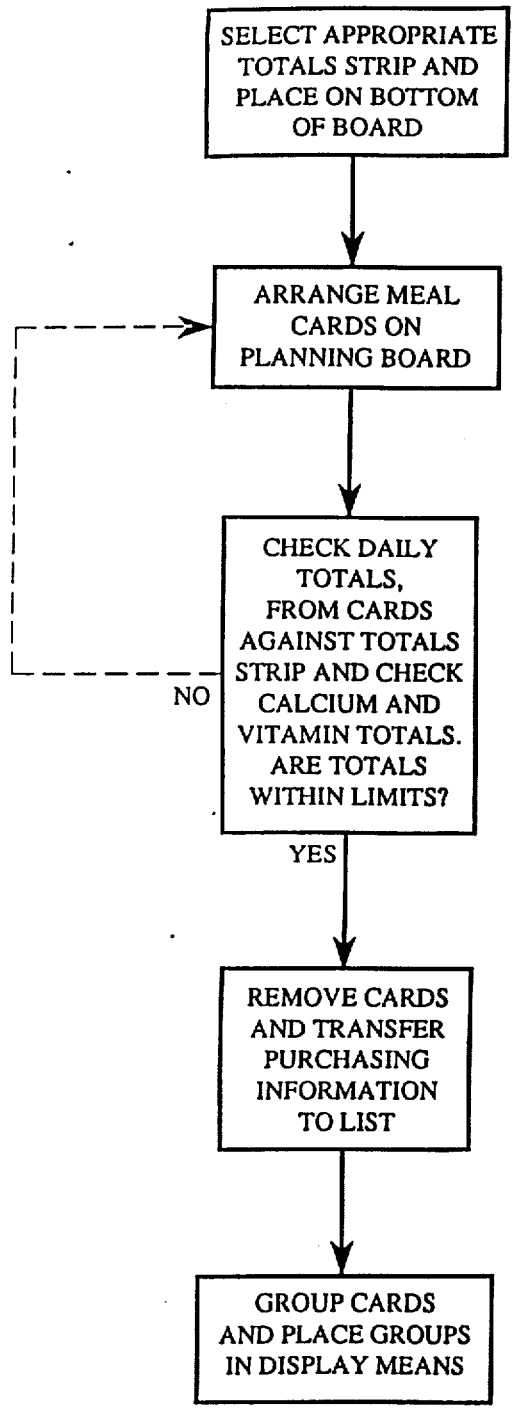
Figure 7:
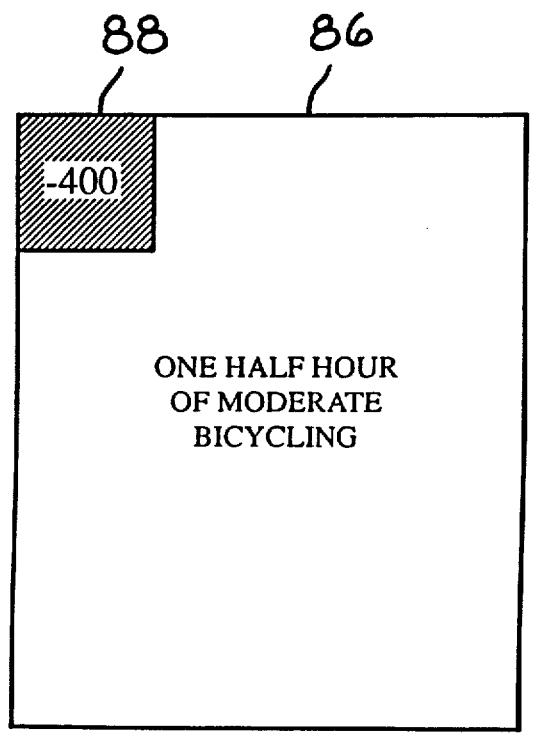
Figure 8:
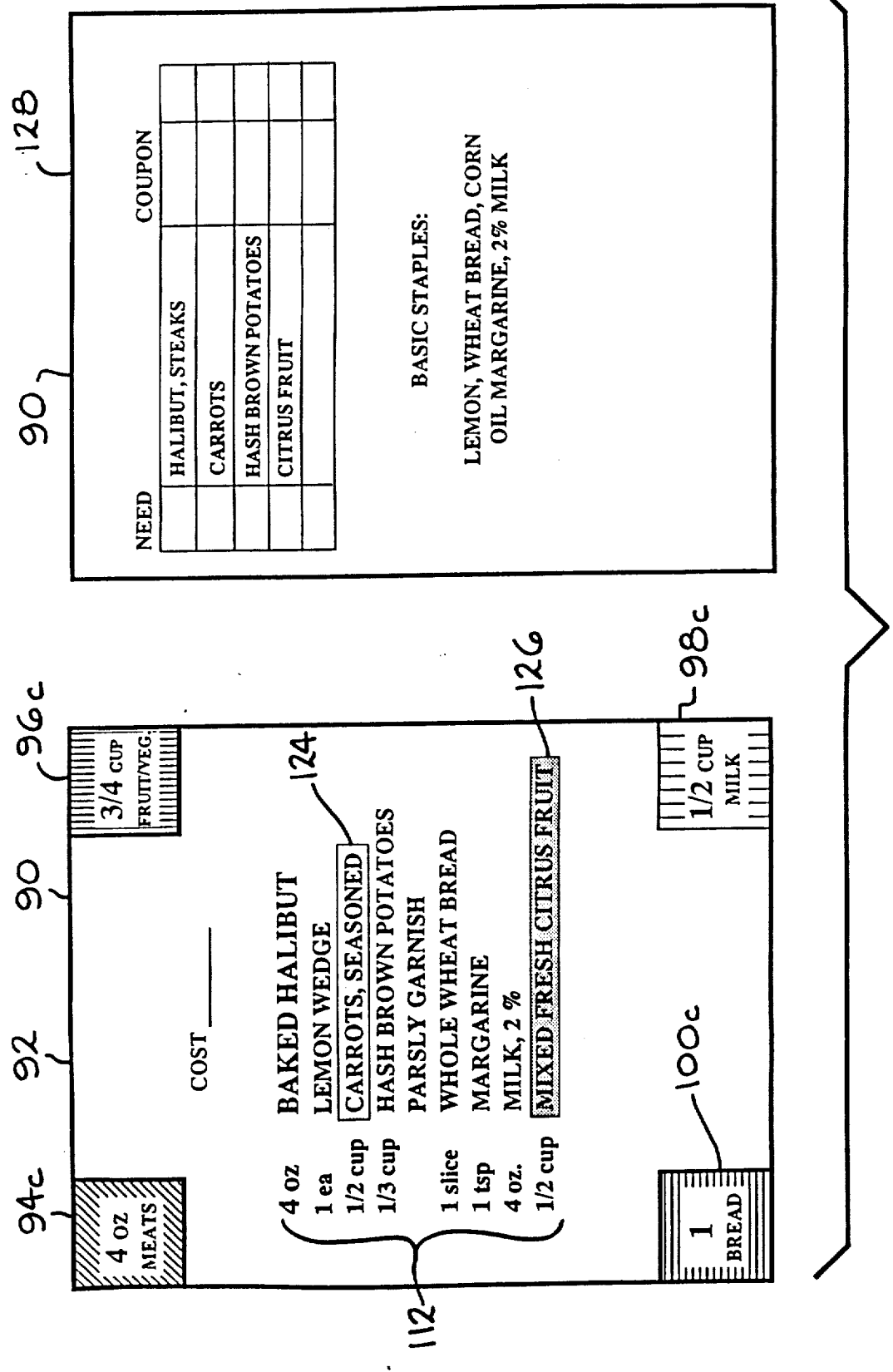
Figure 9:
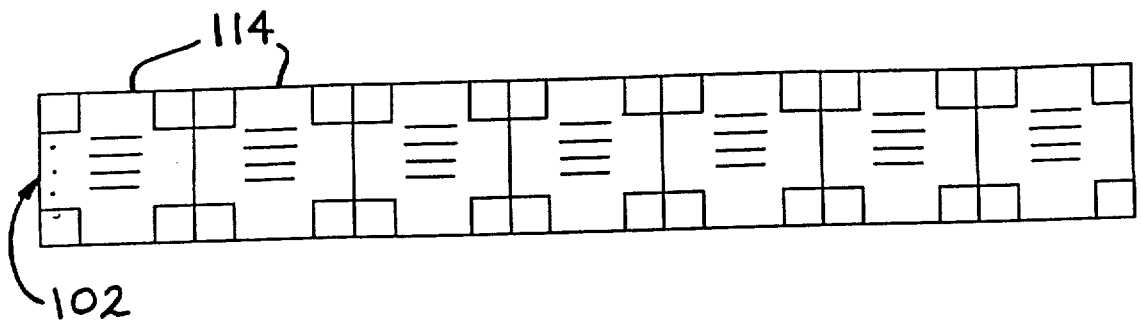
Figure 10:
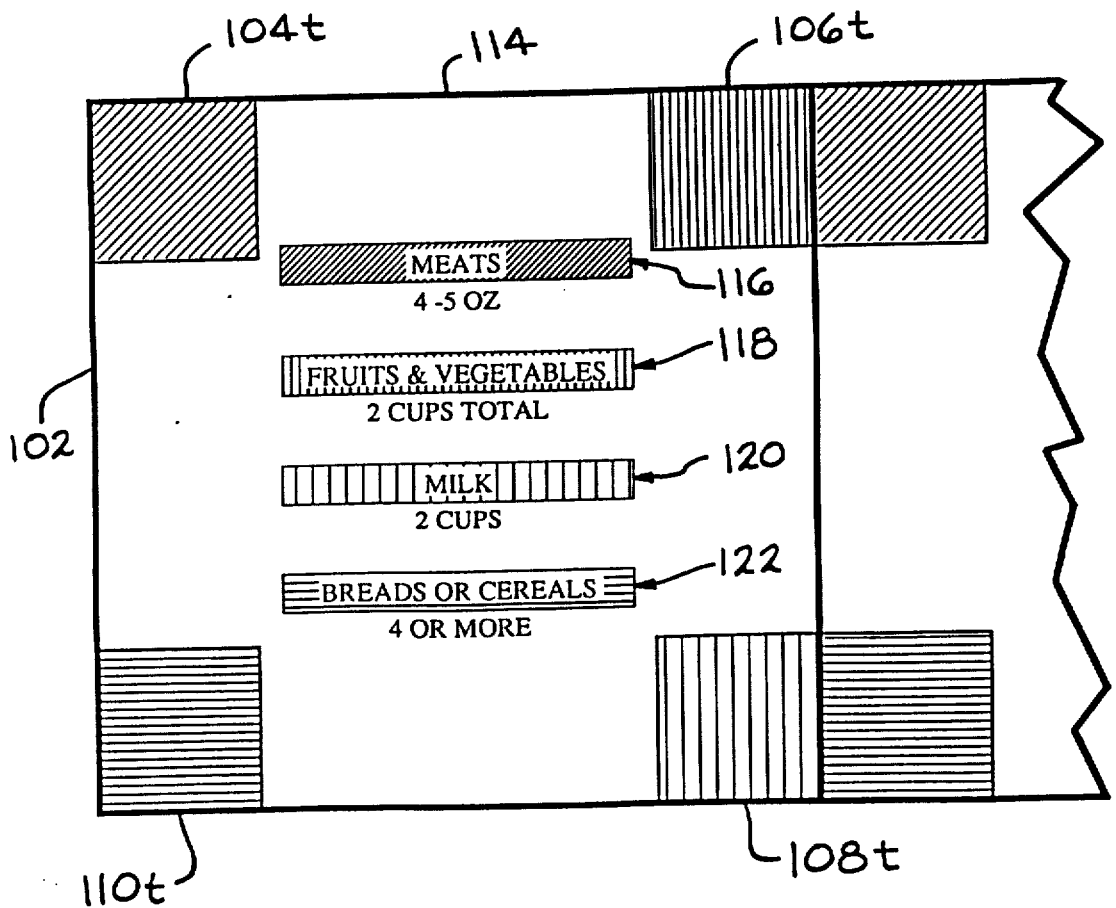

Referring now to FIG. 9, the totals strip 102 contains seven spaces 114 corresponding with the number of days/columns 16 on the board 12 (FIG. 1). Each space 114 contains four identification sections 104t, 106t, 108t and 110t (FIG. 10) corresponding in shading and location with the information sections 94c, 96c, 98c and 100c on the front 92 of the cards 90. In the center of each space 114 on the totals strip 102, there are information sections 116, 118, 120 and 122 corresponding with the identification sections 104t, 106t, 108t and 110t. Information section 116 contains the legend "Meats", contains shading corresponding with the shading of information section 94c and the shading of identification section 104t, and contains the number range "4–5 oz" representing a daily intake of meats which would be part of a weight maintenance diet for a majority of people. Information section 118 contains the legend "Fruits and Vegetables", contains shading corresponding with the shading of information section 96c and the shading of identification section 106t, and contains the legend "2 cups total" representing a daily fruit and vegetable intake which would be part of a weight maintenance diet for a majority of people. Information section 120 contains the legend "Milk", contains shading corresponding with the shading of information section 98c and the shading of identification section 108t, and contains the legend "2 cups" representing a daily milk intake which would be part of a weight maintenance diet for a majority of people. Information section 122 contains the legend "Breads or Cereals", contains shading corresponding with the shading of information section 100c and the shading of identification section 110t, and contains the legend "4 or more", representing a daily bread or cereal intake which would be part of a weight maintenance diet for a majority of people.

Cards corresponding with card 90 and a total strip corresponding with strip 102 are used in the same way as the cards 14 and the totals strip 20. A totals strip which is appropriate for a group of persons is selected and positioned on the board 12 (or is preprinted on the board 12) and cards are selected from a deck of meal cards corresponding with the card 90. The selected cards can then be arranged and displayed, if desired, in the display device 64.

Two of the food items listed on the front 92 of the card 90 are contained in boxes 124 (carrots) and 126 (mixed citrus fruit). The boxes 124 and 126 are shaded and the shading of box 124 (carrots) corresponds with the shading of the color blocks 36 (vitamin A) provided on the board 12 (FIG. 1). Similarly, the shading of box 126 (mixed citrus fruit) corresponds with the shading of color blocks 32 (vitamin C). When a plurality of selected cards are positioned on the board 12, front side up, one can readily count the number of boxes on the selected cards which are shaded, for example, like box 124 (carrots), and compare the total number of such boxes to the number of color boxes 36 (vitamin A) provided on the board 12 to determine whether or not the selected cards provide the recommended number of significant sources of vitamin A for the number of days represented by columns 16 on the board 12. If not, cards can be switched until the recommended number of significant sources are provided for in the menu plan. It may be necessary, if substantial switching is done, to recheck daily totals and make further card switches.

The card 90 has a back side 128 which corresponds with the back side 58 of the card 14 (FIG. 2). Purchasing information can be taken from the back 128 of the card 90 or, institutional dietary professionals may take such information directly from the front 92 of the card 90.

Thus, it will be seen that the instant invention provides a unique and complete method for regulating and planning dietary intake for a period of several days for use in homes and in institutions. It is understood that variations from the invention, as described above, will occur to those skilled in the art but fall, nonetheless, within the scope of the appended claims. For example, the color blocks 32, 34 and 36 (FIG. 1) might be printed on a strip which is positioned on the board 12. Several such strips might be provided to account for differences in vitamin and mineral requirements of different individuals or groups of individuals. In the cards 14, one might provide less than four information blocks by eliminating one or two information blocks pertaining to nutritional factors (such as sodium) which may not be critical to an individual or group of individuals. It is contemplated that decks of cards corresponding with the cards 14 and 90 might be produced reflecting various types of cuisine. It is also contemplated that such decks might include "FREE" cards which could be used for meals which are not represented in a particular set of meal menu cards. Restaurant menus could be incorporated in some of the cards in a deck of meal menu cards.

We claim:

1. A device for planning a series of meals to be consumed over a plurality of days, which series of meals, over the plurality of days, conforms to specific, predetermined dietary goals, said device comprising
- a planning board with grid means defining a plurality of columns having first and second ends, each column containing a plurality of meal menu spaces, with at least one totals space provided on said board, adjacent to the second ends of said columns,
- at least one totals strip bearing first and second numbers reflecting daily dietary goal totals for first and second nutritional factors,
- a deck of meal menu cards, each card having first and second sides, said first side bearing indicia corresponding with and representing a meal menu consisting of a plurality of food items and indicating an amount for each of said plurality of food items, said first side additionally bearing first and second numbers reflecting first and second nutritional factor totals for all of said plurality of food items, in the indicated amounts, in the meal,
- means defining a first, visually discernable characteristic associated with the first number reflecting daily dietary goal totals for the first nutritional factor on said totals strip and with the first number, on each of said cards, reflecting the first nutritional factor total for said plurality of food items, in the indicated amounts, in the meal set forth on said card, and
- means defining a second, visually discernable characteristic associated with the second number reflecting daily dietary goal totals for the second nutritional factor on said totals strip and with the second number, on each of said cards, reflecting the second nutritional factor total for said plurality of food items, in the indicated amounts, in the meal set forth on said card.

2. The device set forth in claim 1 which further comprises daily menu card display means for sequentially storing such of said menu cards as may be selected and for displaying a plurality of such of said selected menu cards.

3. The device set forth in claim 1 wherein said first side of said card additionally bears numbers reflecting third and fourth nutritional factor totals for all of said plurality of food items, in the indicated amounts, in the meal and wherein said totals strip bears third and fourth numbers reflecting daily dietary goal totals for third and fourth nutritional factors, said device further comprising
- means defining a third, visually discernable characteristic associated with the third number reflecting daily dietary goals totals for the third nutritional factor on said totals strip and with the third number, on each of said cards, reflecting the third nutritional factor total for said plurality of food items, in the indicated amounts, in the meal set forth on said card, and
- means defining a fourth, visually discernable characteristic associated with the fourth number reflecting daily dietary goal totals for the fourth nutritional factor on said totals strip and with the fourth number, on each of said cards, reflecting the fourth nutritional factor total for said plurality of food items, in the indicated amounts, in the meals set forth on said card.

4. The device claimed in claim 1 which further comprises
- indicia provided on said board reflecting a minimum requirement for significant sources of at least one vitamin or mineral for the number of days represented by said columns, and
- a third visually discernable characteristic associated with said vitamin or mineral requirement indicia and said indicia setting forth said plurality of food items and an amount for each of said plurality of food items in the meal for each food item in the meal which is a significant source of the particular vitamin or mineral.

5. The device claimed in claim 3 which further comprises
- indicia provided on said board reflecting a minimum requirement for significant sources of at least one vitamin or mineral for the number of days represented by said columns, and
- a fifth visually discernable characteristic associated with said vitamin or mineral requirement indicia and said indicia setting forth said plurality of food items and an amount for each of said plurality of food items in the meal for each food item in the meal which is a significant source of the particular vitamin or mineral.

6. A device for planning a series of meals to be consumed over a plurality of days, which series of meals over the plurality of days, conforms to specific, predetermined dietary goals, said device comprising
- a planning board with grid means defining a plurality of columns having first and second ends, each column containing a plurality of meal menu spaces, with at least one totals space provided on said board, adjacent to the second ends of said columns,
- at least one totals strip bearing first, second, third and fourth numbers reflecting daily dietary goals totals for first, second, third and fourth nutritional factors,
- a deck of meal menu cards, each card having first and second sides, said first side bearing indicia corresponding with and representing a meal menu consisting of a plurality of food items and indicating an amount for each of said plurality of food items, said first side additionally bearing first, second, third and fourth numbers reflecting first, second, third and fourth nutritional factor totals for all of said plurality of food items, in the indicated amounts, in the meal,
- means defining a first, visually discernable characteristic associated with the first number reflecting daily dietary goal totals for the first nutritional factor on said totals strip and with the first number, on each of said cards, reflecting the first nutritional factor total for said plurality of food items, in the indicated amounts, in the meal set forth on said card,
- means defining a second, visually discernable characteristic associated with the second number reflecting daily dietary goal totals for the second nutritional factor on said totals strip and with the second number, on each of said cards, reflecting the second nutritional factor total for said plurality of food items in the indicated amounts, in the meal set forth on said card, means defining a third, visually discernable characteristic associated with the third number reflecting daily dietary goal totals for the third nutritional factor on said totals strip and with the third number, on each of said cards, reflecting the third nutritional factor total for said plurality of food items, in the indicated amounts, in the meal set forth on said card, and means defining a fourth, visually discernable characteristic associated with the fourth number reflecting daily dietary goal totals for the fourth nutritional factor on said totals strip and with the fourth number, on each of said cards, reflecting the fourth nutritional factor total for said plurality of food items, in the indicated amounts, in the meal set forth on said card, indicia provided on said board reflecting a minimum requirement for significant sources of at least one vitamin or mineral for the number of days represented by said columns, and a fifth visually discernable characteristic associated with said vitamin or mineral requirement indicia and said indicia setting forth said plurality of food items and an amount for each of said plurality of food items in the meal for each food item in the meal which is a significant source of the particular vitamin or mineral.

7. The device set forth in claim 6 which further comprises daily menu card display means for sequentially storing such of said menu cards as may be selected and for displaying a plurality of such of said selected menu cards.

* * * * *

UNITED STATES PATENT AND TRADEMARK OFFICE
CERTIFICATE OF CORRECTION

PATENT NO. : 4,979,901  Page 1 of 9

DATED : December 25, 1990

INVENTOR(S) : Herbert R. Robertson, et al

It is certified that error appears in the above-identified patent and that said Letters Patent is hereby corrected as shown below:

The Title page, should be deleted to be replaced with the attached title page.

The sheet of drawings should be deleted to appear as per attached sheets.

Signed and Sealed this

Ninth Day of March, 1993

*Attest:*

STEPHEN G. KUNIN

*Attesting Officer*    Acting Commissioner of Patents and Trademarks

United States Patent [19]
Robertson et al.

[11] Patent Number: 4,979,901
[45] Date of Patent: Dec. 25, 1990

[54] METHOD AND APPARATUS FOR PLANNING AND CONTROLLING DIET

[76] Inventors: Herbert R. Robertson; Joan E. Robertson, both of 6101 Pembridge Dr., Toledo, Ohio 43615

[21] Appl. No.: 456,329

[22] Filed: Dec. 26, 1989

[51] Int. Cl.$^5$ .................................. G09B 1/00
[52] U.S. Cl. .......................... 434/127; 434/430
[58] Field of Search .................. 434/127, 238, 430

[56] References Cited

U.S. PATENT DOCUMENTS

| | | | |
|---|---|---|---|
| 2,188,744 | 1/1940 | Turner | 40/67 |
| 2,337,594 | 12/1943 | Easley | 35/1 |
| 2,747,299 | 5/1956 | Herzog et al. | 35/74 |
| 3,491,715 | 1/1970 | Longarini | 434/127 X |
| 3,681,857 | 8/1972 | Yardley | 35/1 |
| 3,977,106 | 8/1976 | Kapp | 40/70 R |
| 4,278,255 | 7/1981 | Gilbert | 273/248 |
| 4,310,316 | 1/1982 | Thomann | 434/127 |
| 4,464,122 | 4/1984 | Fuller et al. | 434/127 X |
| 4,606,555 | 8/1986 | Adams | 434/127 X |
| 4,650,218 | 3/1987 | Hawke | 283/67 |
| 4,652,241 | 3/1987 | McCarty | 434/127 |
| 4,828,498 | 5/1989 | Tilney | 434/127 |

FOREIGN PATENT DOCUMENTS 2561419 9/1875 France ............... 434/127

OTHER PUBLICATIONS

"Ashland Avenue"; Basic Fore, Inc.; Nov. 1989.
Research, Nov. 1989, vol. 89, No. 11, pp. 1612-1614, Sandra K. Shepherd et al.
Menu Minder Booklet, Blue Shift Software-pp. 1-27.
The Surgeon General's Report on Nutrition and Health, pp. 1-77.

*Primary Examiner*—Richard J. Apley
*Assistant Examiner*—Rachel M. Healey
*Attorney, Agent, or Firm*—John C. Purdue; David C. Purdue

[57] ABSTRACT

A method and a device for planning means for an extended period of time is disclosed. The device comprises a planning board, a deck of meal menu cards and at least one daily totals strip. The device may further comprise a card display apparatus. The planning board contains a plurality of columns representing days and each column has a plurality of spaces representing meals in a day. At one end of the columns, there is a totals strip with information sections including indicia setting forth daily limits or goals for specific nutritional factors. The meal menu cards contain indicia setting forth a balanced meal and the cards include information sections with indicia setting forth nutritional factors for the meal. The information sections on the cards and the totals strip are each coded with a visually discernable characteristic such as color. Nutritional information from each card in a given column is totalled and compared with the daily goals or limits indicated on the totals strip. If necessary, cards are removed and replaced until the daily totals for the cards in each of the columns are within or close enough to the limits/goals on the totals strip. In a preferred embodiment, foods listed on the meal menu cards which are sources of vitamins or minerals are identified with a visually discernable characteristic, preferably color, and the board includes indicia setting forth requirements for sources of such vitamins and minerals for the number of days represented by columns on the board.

7 Claims, 6 Drawing Sheets

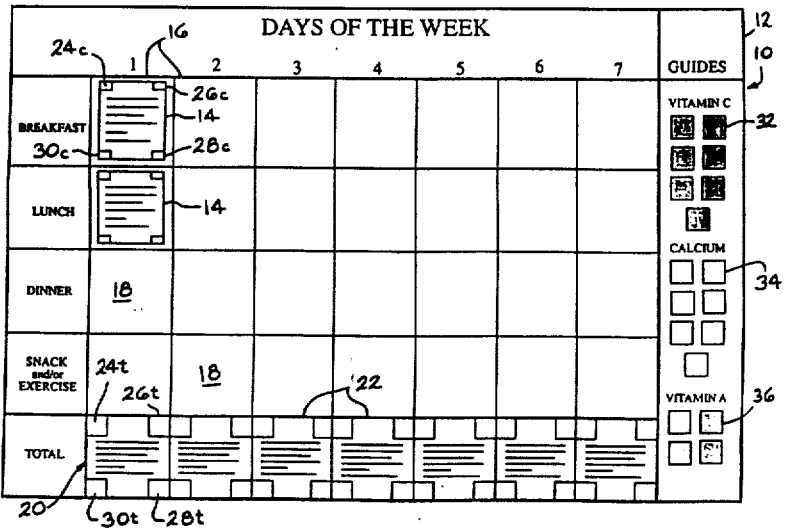

FIG.1